(12) United States Patent
Kong et al.

(10) Patent No.: US 12,418,064 B2
(45) Date of Patent: Sep. 16, 2025

(54) CAPACITOR-ASSISTED BATTERY CELL

(71) Applicant: GM GLOBAL TECHNOLOGY OPERATIONS LLC, Detroit, MI (US)

(72) Inventors: Dewen Kong, Shanghai (CN); Dave G. Rich, Sterling Heights, MI (US); Xiaochao Que, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 753 days.

(21) Appl. No.: 17/732,618

(22) Filed: Apr. 29, 2022

(65) Prior Publication Data

US 2023/0291037 A1     Sep. 14, 2023

(30) Foreign Application Priority Data

Mar. 14, 2022   (CN) .......................... 202210245850.2

(51) Int. Cl.
*H01M 16/00*   (2006.01)
*H01M 4/133*   (2010.01)
(Continued)

(52) U.S. Cl.
CPC ........... *H01M 16/00* (2013.01); *H01M 4/133* (2013.01); *H01M 4/587* (2013.01); *H01M 4/623* (2013.01); *H01M 4/625* (2013.01); *H01M 10/0525* (2013.01); *H01M 10/056* (2013.01); *H01M 2004/021* (2013.01); *H01M 2004/027* (2013.01);
(Continued)

(58) Field of Classification Search
CPC . H01M 16/00; H01M 10/052; H01M 10/0525
See application file for complete search history.

(56) References Cited

U.S. PATENT DOCUMENTS

| | | | |
|---|---|---|---|
| 10,297,885 B2 | 5/2019 | Gayden et al. | |
| 10,658,663 B2 | 5/2020 | Zhang et al. | |

(Continued)

FOREIGN PATENT DOCUMENTS

| | | | |
|---|---|---|---|
| DE | 102017116964 A1 | 2/2018 | |
| KR | 101168740 B1 * | 7/2012 | ............ H01M 16/00 |

OTHER PUBLICATIONS

Office Action dated Apr. 8, 2024 from German Patent Office for German Patent No. 102022111252.7; 6pgs.

*Primary Examiner* — Jeremiah R Smith

(57) ABSTRACT

A pouch-type, capacitor-assisted battery cell includes: N negative electrodes, where N is an integer greater than one, each of the N negative electrodes includes a first current collector, first particulate electrode material, and a first tab; P positive electrodes, where: P-M ones of the P positive electrodes include a second current collector, second particulate electrode material, and a second tab, M ones of the P positive electrodes include a third current collector, third particulate electrode material including activated carbon (AC) arranged on opposite sides of the third current collector, and a third tab, and P=N−1 and M=2; separators arranged between the N negative electrodes and the P positive electrodes; and a pouch enclosure surrounding the N negative electrodes, the P positive electrodes and the separators; where the M ones of the P positive electrodes are located approximately equidistant from a center of the P positive electrodes.

19 Claims, 3 Drawing Sheets

(51) Int. Cl.
*H01M 4/587* (2010.01)
*H01M 4/62* (2006.01)
*H01M 10/0525* (2010.01)
*H01M 10/056* (2010.01)
*H01M 4/02* (2006.01)

(52) U.S. Cl.
CPC .. *H01M 2004/028* (2013.01); *H01M 2220/20* (2013.01); *H01M 2300/0025* (2013.01)

(56) References Cited

U.S. PATENT DOCUMENTS

| | | |
|---|---|---|
| 10,693,176 B2 | 6/2020 | Liu et al. |
| 10,826,139 B2 | 11/2020 | Rich et al. |
| 10,944,100 B2 | 3/2021 | Liu et al. |
| 11,196,097 B2 | 12/2021 | Gu et al. |
| 11,205,798 B2 | 12/2021 | Li et al. |
| 11,239,469 B2 | 2/2022 | Li et al. |
| 11,295,901 B2 | 4/2022 | Hou et al. |
| 2002/0080558 A1* | 6/2002 | Nonaka ................. H01G 11/30 361/502 |
| 2006/0264188 A1* | 11/2006 | Mars .................... H04B 1/0466 455/127.1 |
| 2018/0034094 A1* | 2/2018 | Liu ....................... H01M 4/483 |
| 2019/0020063 A1* | 1/2019 | Kim ................... H01M 10/0569 |
| 2019/0061555 A1 | 2/2019 | Liu et al. |
| 2019/0341648 A1 | 11/2019 | Wu et al. |
| 2019/0372186 A1* | 12/2019 | Kong ..................... H01G 11/62 |
| 2020/0036053 A1* | 1/2020 | Li ........................... H01M 4/13 |
| 2020/0036070 A1* | 1/2020 | Li ...................... H01M 10/056 |
| 2020/0118770 A1 | 4/2020 | Liu et al. |
| 2020/0173028 A1 | 6/2020 | Liu et al. |
| 2020/0259149 A1* | 8/2020 | Lee ..................... H01M 50/417 |
| 2020/0279695 A1 | 9/2020 | Lu et al. |
| 2021/0012975 A1 | 1/2021 | Su et al. |
| 2021/0028481 A1 | 1/2021 | Hou et al. |
| 2021/0065992 A1 | 3/2021 | Lu et al. |
| 2021/0110979 A1 | 4/2021 | Que et al. |
| 2021/0110980 A1 | 4/2021 | Su et al. |
| 2021/0111426 A1 | 4/2021 | Li et al. |
| 2021/0125791 A1 | 4/2021 | Li et al. |
| 2021/0135224 A1 | 5/2021 | Hou et al. |
| 2021/0151260 A1 | 5/2021 | Kong et al. |
| 2021/0151809 A1 | 5/2021 | Kong et al. |
| 2022/0013777 A1* | 1/2022 | Nagai ............... H01M 10/0525 |
| 2023/0327288 A1* | 10/2023 | Wang ................. H01M 50/431 429/129 |

* cited by examiner

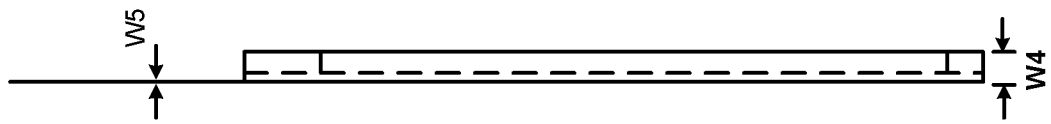
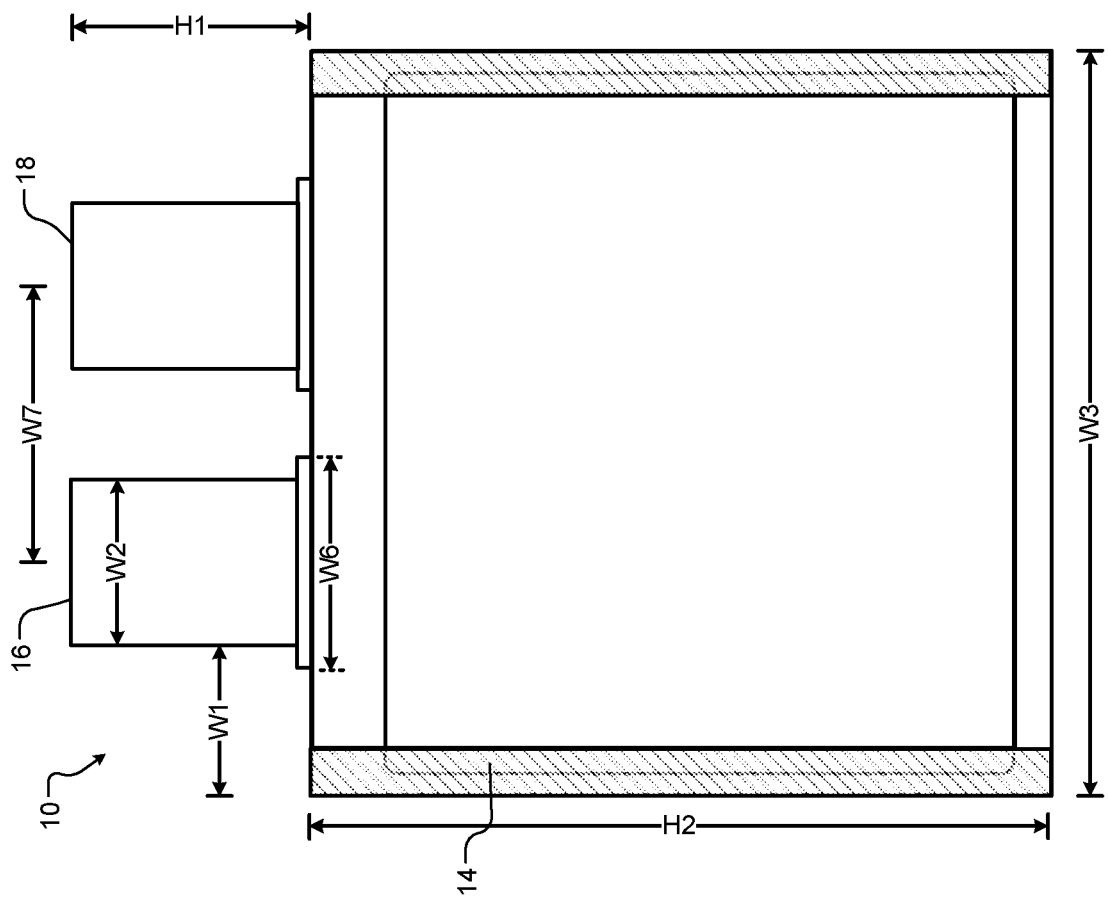

CAPACITOR-ASSISTED BATTERY CELL

CROSS-REFERENCE TO RELATED APPLICATIONS

This application claims the benefit of Chinese Patent Application No. 202210245850.2, filed on Mar. 14, 2022. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to battery systems for vehicles, and more particularly to a capacitor-assisted battery (CAB) cell for battery systems of vehicles.

Low voltage automotive battery systems such as 12V battery systems can be used for starting vehicles including an internal combustion engine (ICE) and/or to support vehicle accessory loads or other vehicle systems for these types of vehicles. Low voltage automotive battery systems can also be used to support vehicle accessory loads in electric vehicles (EVs) such as battery electric vehicles, hybrid vehicles and/or fuel cell vehicles. In some applications, the battery systems use lithium-ion battery cells due to their increased pulsed power density at both warm and cold temperatures and lower weight.

During starting, the battery system supplies current to a starter to crank the ICE. For one application, once the engine is started, the battery system continues to supply power for various electrical systems of the vehicle. An alternator or regeneration recharges the battery system. In other applications, the low voltage battery system may also be used to support emergency stop operation of autonomous vehicles.

SUMMARY

In a feature, a pouch-type, capacitor-assisted battery cell includes: N negative electrodes, where N is an integer greater than one, where each of the N negative electrodes comprises a first current collector, first particulate electrode material arranged on opposite sides of the first current collector, and a first tab; P positive electrodes, where: P-M ones of the P positive electrodes include a second current collector, second particulate electrode material including lithium iron phosphate (LFP) arranged on opposite sides of the second current collector, and a second tab, M ones of the P positive electrodes include a third current collector, third particulate electrode material including activated carbon (AC) arranged on opposite sides of the third current collector, and a third tab, and P=N−1 and M=2; separators arranged between the N negative electrodes and the P positive electrodes; and a pouch enclosure surrounding the N negative electrodes, the P positive electrodes and the separators; where the M ones of the P positive electrodes are located approximately equidistant from a center of the P positive electrodes.

In further features, N=28 and the M ones of the P positive electrodes are located at $3^{rd}$ and $25^{th}$ locations.

In further features, the first particulate electrode material of the N negative electrodes includes graphite.

In further features, the first particulate electrode material of the N negative electrodes further includes conductive carbon, carboxymethyl cellulose (CMC) and styrene butadiene copolymer (SBR).

In further features, weight percentages of the graphite, the conductive carbon, the carboxymethyl cellulose (CMC) and the styrene butadiene copolymer (SBR) are 94% to 96%, 1.5% to 2.5%, 1% to 2%, and 1% to 2% (wt %).

In further features: the first particulate electrode material of the N negative electrodes has a thickness on opposite sides of the first current collector in a range of 31 μm (+/−5 μm), the first current collector includes copper foil having a thickness in a range of 8 μm (+/−2 μm); the first current collector has a width in a range of 13.2 cm (+/−5%); and the first current collector has a height in a range of 10.3 cm (+/−5%).

In further features, the second particulate electrode material of the P-M ones of the P positive electrodes further includes conductive carbon, carbon nanotubes and polyvinylidene fluoride.

In further features, weight percentages of the lithium iron phosphate, the conductive carbon, the carbon nanotubes and the polyvinylidene fluoride are 90 to 94%, 4 to 6%, 0.1% to 0.4% and 2 to 4% (wt %), respectively.

In further features: the second particulate electrode material of the P-M ones of the P positive electrodes have a thickness opposite sides of the third current collector in a range of 50 μm (+/−5 μm); the second current collector comprises carbon-coated aluminum foil having a thickness in a range of 12 μm (+/−2 μm); the second current collector has a width in a range of 13 cm (+/−5%), and the second current collector has a height in a range of 10 cm (+/−5%).

In further features: the third particulate electrode material of the M ones of the P positive electrodes has a thickness on opposite sides of the third current collector in a range of 100 μm (+/−30 μm); the third current collector includes etched aluminum foil having a thickness in a range of 20 μm (+/−2 μm); the third current collector has a width in a range of 13 cm (+/−5%); and the third current collector has a height in a range of 10 cm (+/−5%).

In further features, the separators include: a first layer of ceramic layer; a second layer of polyethylene film; and a third layer of ceramic.

In further features: the separators have a thickness in a range of 15 μm (+/−5 μm), and the separators have a height in a range of 10.7 cm (+/−5%).

In further features, electrolyte is included.

In further features, the electrolyte includes 1.2M lithium hexafluorophosphate (LiPF$_6$), ethylene carbonate (EC), ethyl methyl carbonate (EMC), and dimethyl carbonate (DMC).

In further features, the electrolyte further includes at least one of vinylene carbonate, lithium difluorophosphate, and ethylene sulfate (DTD).

In a feature, a pouch-type, capacitor-assisted battery cell includes: N negative electrodes, where N is equal to 28, where each of the N negative electrodes comprises a first current collector having a width in a range of 13.2 cm (+/−5%) and a height in a range of 10.3 cm (+/−5%), first particulate electrode material including graphite arranged on opposite sides of the first current collector, and a first tab; P positive electrodes, where: P-M ones of the P positive electrodes comprise a second current collector having a width in a range of 13 cm (+/−5%) and a height in a range of 10 cm (+/−5%), second particulate electrode material including lithium iron phosphate (LFP) arranged on opposite sides of the second current collector, and a second tab;

M ones of the P positive electrodes include a third current collector having a width in a range of 13 cm (+/−5%) and a height in a range of 10 cm (+/−5%), third particulate electrode material including activated carbon (AC) arranged on opposite sides of the third current collector, and a third tab; and P is equal to 27 and M is equal to 2; separators arranged between the N negative electrodes and the P positive electrodes; and a pouch enclosure surrounding the N negative electrodes, the P positive electrodes and the separators.

In further features, the M ones of the P positive electrodes are located at a $3^{nd}$ and $25^{th}$ location.

In further features: the first particulate electrode material of the N negative electrodes further includes conductive carbon, carboxymethyl cellulose (CMC) and styrene butadiene copolymer (SBR), and weight percentages of the graphite, the conductive carbon, the carboxymethyl cellulose (CMC) and the styrene butadiene copolymer (SBR) are 94% to 96%, 1.5% to 2.5%, 1% to 2%, and 1% to 2% (wt %), respectively, the first particulate electrode material of the N negative electrodes has a thickness on opposite sides of the first current collector in a range of 31 μm (+/−5 μm), and the first current collector comprises copper foil having a thickness in a range of 8 μm (+/−2 μm).

In further features: the second particulate electrode material of the P-M ones of the P positive electrodes further includes conductive carbon, carbon nanotubes and polyvinylidene fluoride, weight percentages of the lithium iron phosphate, the conductive carbon, the carbon nanotubes and the polyvinylidene fluoride correspond to 90 to 94%, 4 to 6%, 0.1% to 0.4% and 2 to 4% (wt %), respectively, the second particulate electrode material of the P-M ones of the P positive electrodes have a thickness opposite sides of the third current collector in a range of 50 μm (+/−5 μm); and the second current collector includes carbon-coated aluminum foil having a thickness in a range of 12 μm (+/−2 μm).

In further features: the third particulate electrode material of the M ones of the P positive electrodes have a thickness opposite sides of the third current collector in a range of 100 μm (+/−30 μm); and the third current collector includes etched aluminum foil having a thickness in a range of 20 μm (+/−2 μm).

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A and 4B are side views of an example of the pouch-type CAB cell according to the present disclosure.

In the drawings, reference numbers may be reused to identify similar and/or identical elements.

DETAILED DESCRIPTION

The present disclosure relates to a pouch-type capacitor-assisted battery (CAB) cell with improved performance. The CAB cell includes positive electrodes comprising positive battery electrodes including LFP and positive capacitor electrodes comprising activated carbon. The CAB cell includes negative electrodes comprising graphite. Separators are arranged between the positive and negative electrodes. Liquid electrolyte is arranged in a pouch-type enclosure of the pouch-type CAB cell. Additional details are set forth below.

Figure 1:
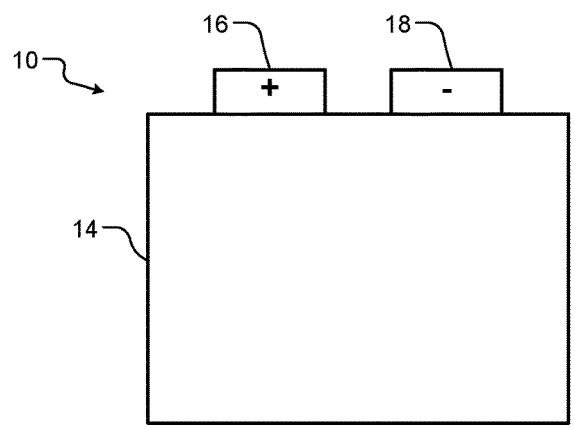
FIG. 1 is a side view of an example of a pouch-type capacitor-assisted battery (CAB) cell according to the present disclosure.

Referring now to FIG. 1, a pouch-type CAB cell 10 includes a pouch-type enclosure 14. As will be described further below, the pouch-type enclosure 14 of the pouch-type CAB cell 10 encloses positive electrodes, negative electrodes, separators, and electrolyte. Positive and negative terminals 16, 18 are connected to tabs of the positive and negative electrodes and pass through the pouch-type enclosure 14.

Figure 2A:
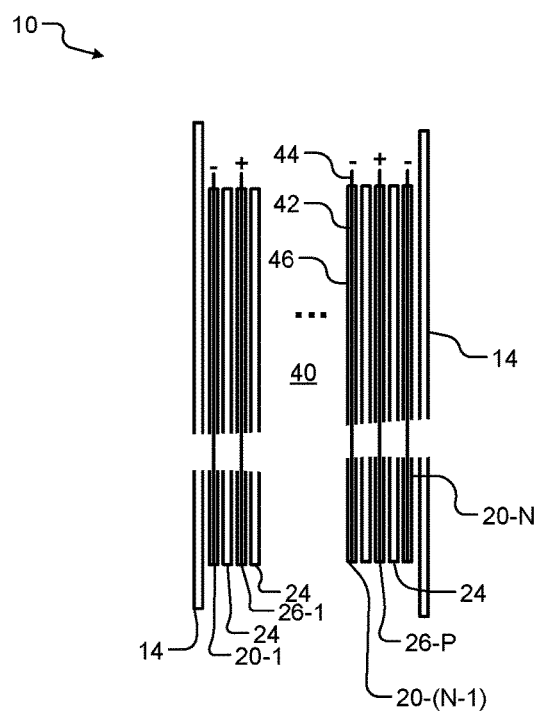
FIG. 2A is a partial side cross-sectional view of an example of a portion of the pouch-type CAB cell according to the present disclosure.

Referring now to FIGS. 2A-2D, a portion of the pouch-type CAB cell 10 is shown. In FIG. 2A, the pouch-type CAB cell 10 comprises negative electrodes 20-1, . . . , 20-(N-1) and 20-N (collectively negative electrodes 20) and positive electrodes 26-1, . . . , 26-(P-1) and 26-P (collectively positive electrodes 26) (where N and P are integers greater than one). The pouch-type CAB cell 10 includes a plurality of separators 24 arranged between the negative electrodes 20 and the positive electrodes 26.

The negative electrodes 20 and the positive electrodes 26 include a current collector 42 and a tab 44 extending beyond the particulate electrode material 46. The tabs 44 of the negative electrodes 20 and the positive electrodes 26 are connected to the negative terminal 18 and the positive terminal 16 of the pouch-type CAB cell 10, respectively. A first side and a second side of the current collector 42 include particulate electrode material 46 bonded thereto. As used herein, positive (+) and negative (−) refers the electrical charge of the charged electrode in the cell unit (as it is being discharged).

Figures 2B, 2C, 2D:
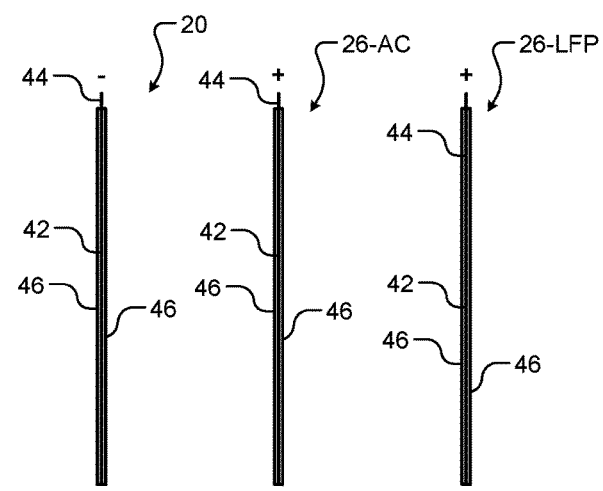
FIG. 2B is a side cross-sectional view of an example of a negative electrode according to the present disclosure.
FIG. 2C is a side cross-sectional view of an example of a positive capacitor electrode including activated carbon according to the present disclosure.
FIG. 2D is a side cross-sectional view of an example of a positive battery electrode including lithium iron phosphate (LFP) according to the present disclosure.

In FIGS. 2B-2D, examples of the particulate electrode material 46 are shown. In FIG. 2B, the particulate electrode material 46 of the negative electrodes 20 comprises graphite. In FIG. 2C, the particulate electrode material 46 of some of the positive electrodes 26-AC comprises activated carbon (AC) (forming a positive capacitor electrode). In FIG. 2D, the particulate electrode material 46 of remaining ones of the electrodes 26-LFP comprises lithium iron phosphate (LFP) (forming a positive battery electrode).

Figure 3:
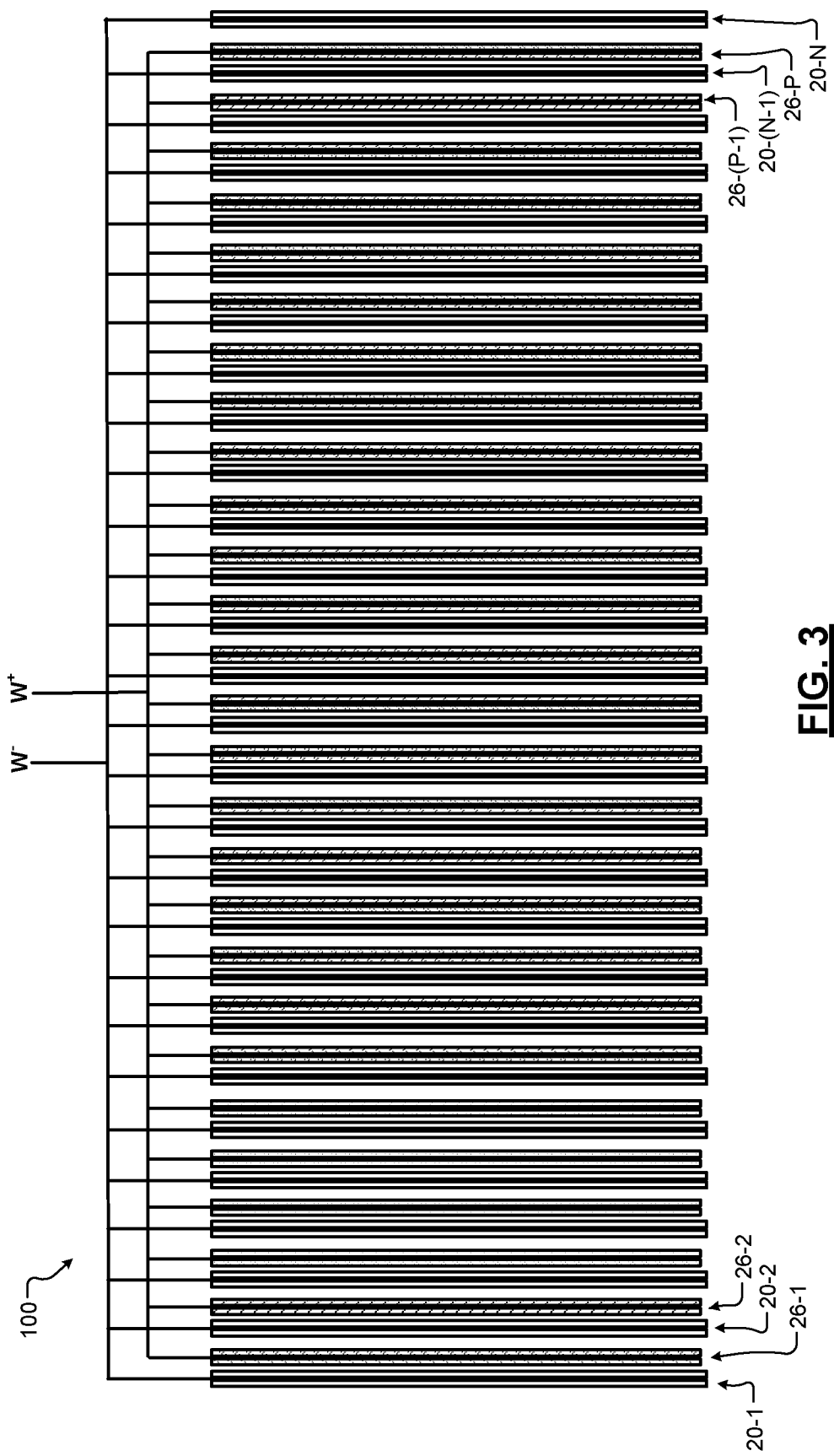
FIG. 3 is a side cross-sectional view of an example of the pouch-type CAB cell according to the present disclosure.

Referring now to FIG. 3, the pouch-type CAB cell 10 includes the negative electrodes 20-1, 20-2, . . . , 20-N where N=28. In some examples, the particulate electrode material 46 of the negative electrodes 20 comprises graphite. The pouch-type CAB cell 100 further includes the positive electrodes 26-1, 26-2, . . . 26-P where P=(N−1)=27. The particulate electrode material 46 of two of the positive electrodes 26 comprises activated carbon (AC). The particulate electrode material of 25 of the positive electrodes 26 comprises lithium iron phosphate (LFP).

In this example, the positive electrodes 26 arranged at the $2^{nd}$ and $26^{th}$ positions (corresponding to positive electrodes 26-2 and 26-26 from left to right in FIG. 3) are positive capacitor electrodes comprising activated carbon. As can be appreciated, the positive electrodes 26-2 and 26-26 are located approximately equidistant from a center of the pouch-type CAB cell 100 as can be seen in FIG. 3. While specific positions are shown and described, the positive capacitor electrodes comprising activated carbon can be located in other approximately equidistant positions such as the $3^{rd}$ and $25^{th}$ locations, the $4^{th}$ and $24^{th}$ locations, the $5^{th}$ and $23^{rd}$ locations, etc.

The positive capacitor electrodes can be located in other approximately equidistant positions such as $2^{nd}$ and 22nd locations, the $4^{th}$ and $23^{rd}$ locations, the $5^{th}$ and $25^{th}$ locations, etc. As used herein, approximately equidistant means within 10% of equidistant. This arrangement allows for more uniform thermal heating and cooling characteristics. As can be appreciated, the separators 24, the electrolyte 40 and other details are omitted from FIG. 3 for purposes of illustration and clarity.

In some examples, the positive electrodes 26-LFP have a width in a range of 13 cm (+/−5%) and height in a range of 10 cm (+/−5%). The particulate electrode material 46 of the positive electrodes 26-LFP has a surface area of less than 10 m$^2$/g, a carbon coating of 1.5%+/−1%, and particle size of D50=2+3/−1 μm and D97<8 μm. The particulate electrode material 46 of the positive electrodes 26-LFP includes lithium ion phosphate (LFP), Super P® (SP) conductive carbon, carbon nanotubes (CNT) and polyvinylidene fluoride (PVDF). In some examples, the chemical recipe for LFP/SP/CNT/PVDF is 90 to 94%, 4 to 6%, 0.1% to 0.4% and 2 to 4% (wt %), respectively, of the particulate electrode material 46. In other examples, the chemical recipe for LFP/SP/CNT/PVDF is 92%, 4.8%, 0.2% and 3% (wt %) respectively, of the particulate electrode material. In some examples, mass loading is 8.7+/−2 mg/cm$^2$ and capacity loading is 1.1+/−0.5 mAh/cm$^2$ (one sided).

In some examples, the positive electrodes 26-LFP have a pressing density of 2.0±0.3 g/cm$^3$ and a porosity of 41±5%. The positive electrodes 26-LFP have a coating thickness of 50 μm (+/−5 μm) (one side) and an overall thickness of 112 μm (+/−10 μm). The current collector 42 comprises a carbon-coated Al foil having a thickness of 12 μm (+/−2 μm), although other materials and thicknesses can be used.

In some examples, the positive electrodes 26-AC have a width in a range of 13 cm (+/−5%) and height in a range of 10 cm (+/−5%). In some examples, the particulate electrode material of the positive electrodes 26-AC comprises Kuraray YP50. The positive electrodes 26-AC have a mass loading of 7±2 mg/cm$^2$ and capacity loading of 0.3±0.15 mAh/cm$^2$. The positive electrodes 26-AC have a coating thickness of 100 μm (+/−30 μm) (single-side) and an electrode thickness of 220 μm (+/−60 μm) with porosity of 85±10%.

In some examples, the positive electrodes 26-AC are fabricated using a polytetrafluoroethylene (PTFE)-based dry process. The current collector of the positive electrodes 26-AC comprises etched Al foil having a thickness of 20 μm (+/−2 μm), although other materials and thicknesses can be used. In other examples, positive electrodes 26-AC are fabricated using a PVDF based wet process. The current collector of the positive electrodes 26-AC comprises carbon coated Al foil having a thickness of 20 μm (+/−5 μm), although other materials and thicknesses can be used.

In some examples, the negative electrodes 20 have a width in a range of 13.2 cm (+/−5%) and a height in a range of 10.3 cm (+/−5%). In some examples, the particulate electrode material 46 of the negative electrodes 20 includes graphite having a surface area of 2+5/−0.5 m$^2$/g and a particle size of D50 7+5/−3 μm. In some examples, the particulate electrode material 46 includes graphite, Super P® (SP) conductive carbon, carboxymethyl cellulose (CMC) and styrene butadiene copolymer (SBR). In some examples, the chemical recipe for graphite/SP/CMC/SBR is 94% to 96%, 1.5% to 2.5%, 1% to 2%, and 1% to 2% (wt %) respectively, of the particulate electrode material 46. In some examples, the chemical recipe for graphite/SP/CMC/SBR is 95%, 2%, 1.2% and 1.8%, (wt %) respectively, of the particulate electrode material 46. In some examples, electrode mass loading is 4 mg/cm$^2$ and capacity loading of 1.3±0.5 mAh/cm$^2$ (one sided).

In some examples, the pressing density of the graphite electrodes is 1.4±0.3 g/cm$^3$ and porosity is 47.0±5%. The negative electrodes have a coating thickness of 31 μm (+/−5 μm) (one side) and electrode thickness of 70 μm (+/−10 μm). The current collector comprises Cu foil having a thickness of 8 μm (+/−2 μm), although other materials and thicknesses can be used.

In some examples, the separators 24 have a height in a range of 10.7 cm (+/−5%). The separators 24 comprise outer ceramic layers and a polyethylene (PE) layer sandwiched therebetween. In some examples, the separators 24 have a thickness of 13 μm (+/−3 μm) and include a 2 μm ceramic layer, a 9 μm PE film and a 2 μm ceramic layer. In some examples, the separators 24 have a thickness of 12 μm (+/−3 μm) and include a 3 μm ceramic layer, a 9 μm PE film. In some examples, the separators 24 have a porosity of 40±5%.

In some examples, the electrolyte 40 has a formula 1.2M lithium hexafluorophosphate (LiPF$_6$) in a mixture of ethylene carbonate (EC), ethyl methyl carbonate (EMC), and dimethyl carbonate (DMC) (4:4:2 volume ratio) and additional additives of 1-5% vinylene carbonate (VC), 1-3% lithium difluorophosphate (LiPF$_2$O$_2$), and 1-10% ethylene sulfate (DTD). In some examples, the amount of electrolyte 40 per cell is equal to 6±2 g/Ah.

Referring now to FIGS. 4A and 4B, examples of dimensions of the pouch-type battery cell are shown in additional detail. A width W1 from an edge of the positive terminal 16 is in a range of 25 mm (±3%). A width W2 of the positive terminal 16 and the negative terminal 18 is in a range of 32+/−3 mm ( ). A height H1 of the positive terminal 16 and the negative terminal 18 is in a range of 40+/−5 mm ( ). A height H2 of the pouch-type enclosure 14 is in a range of 120 mm (+/−5%). A width W4 of the pouch-type enclosure 14 is in a range of 133 mm (+/−5%). A width W6 of the connecting tab is in a range of 40+/−5 mm. A width W7 between centers of the positive terminal 16 and the negative terminal 18 is in a range of 46+/−5 mm.

The CAB cell according to the present disclosure has excellent pulsed and continuous power capability at both warm and cold temperatures and outstanding high temperature durability. In some examples, the 6.3 Ah CAB cell according to the present disclosure provides back-up operational power for 3 minutes at 100W continuous power during an emergency stop of an autonomous vehicle. The CAB cell according to the present disclosure also provides high cranking current.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A pouch-type, capacitor-assisted battery cell, comprising:
   N negative electrodes, where N is an integer greater than one, wherein each of the N negative electrodes comprises a first current collector, first particulate electrode material arranged on opposite sides of the first current collector, and a first tab;
   P positive electrodes, wherein:
      P-M ones of the P positive electrodes comprise a second current collector, second particulate electrode material comprising lithium iron phosphate (LFP) arranged on opposite sides of the second current collector, and a second tab,
      M ones of the P positive electrodes comprise a third current collector, third particulate electrode material comprising activated carbon (AC) arranged on opposite sides of the third current collector, and a third tab, and
      P=N−1 and M=2;
   separators arranged between the N negative electrodes and the P positive electrodes; and
   a pouch enclosure surrounding the N negative electrodes, the P positive electrodes and the separators;
   wherein the M ones of the P positive electrodes are located approximately equidistant from a center of the P positive electrodes; and
   wherein N=28 and the M ones of the P positive electrodes are located at 3rd and $25^{th}$ locations.

2. The pouch-type, capacitor-assisted battery cell of claim 1, wherein the first particulate electrode material of the N negative electrodes comprises graphite.

3. The pouch-type, capacitor-assisted battery cell of claim 2, wherein the first particulate electrode material of the N negative electrodes further comprises conductive carbon, carboxymethyl cellulose (CMC) and styrene butadiene copolymer (SBR).

4. The pouch-type, capacitor-assisted battery cell of claim 3, wherein weight percentages of the graphite, the conductive carbon, the carboxymethyl cellulose (CMC) and the styrene butadiene copolymer (SBR) are 94% to 96%, 1.5% to 2.5%, 1% to 2%, and 1% to 2% (wt %).

5. The pouch-type, capacitor-assisted battery cell of claim 1, wherein:
   the first particulate electrode material of the N negative electrodes has a thickness on opposite sides of the first current collector in a range of 31 μm (+/−5 μm);
   the first current collector comprises copper foil having a thickness in a range of 8 μm (+/−2 μm);
   the first current collector has a width in a range of 13.2 cm (+/−5%); and
   the first current collector has a height in a range of 10.3 cm (+/−5%).

6. The pouch-type, capacitor-assisted battery cell of claim 5, wherein the separators comprise:
   a first layer of ceramic layer;
   a second layer of polyethylene film; and
   a third layer of ceramic.

7. The pouch-type, capacitor-assisted battery cell of claim 5, wherein:
   the separators have a thickness in a range of 13 μm (+/−2 μm); and
   the separators have a height in a range of 10.7 cm (+/−5%).

8. The pouch-type, capacitor-assisted battery cell of claim 5, further comprising electrolyte.

9. The pouch-type, capacitor-assisted battery cell of claim 8, wherein the electrolyte comprises 1.2M lithium hexafluorophosphate ($LiPF_6$), ethylene carbonate (EC), ethyl methyl carbonate (EMC), and dimethyl carbonate (DMC).

10. The pouch-type, capacitor-assisted battery cell of claim 9, wherein the electrolyte further comprises at least one of vinylene carbonate, lithium difluorophosphate, and ethylene sulfate (DTD).

11. The pouch-type, capacitor-assisted battery cell of claim 1, wherein the second particulate electrode material of the P-M ones of the P positive electrodes further comprises conductive carbon, carbon nanotubes and polyvinylidene fluoride.

12. The pouch-type, capacitor-assisted battery cell of claim 11, wherein weight percentages of the lithium iron phosphate, the conductive carbon, the carbon nanotubes and the polyvinylidene fluoride are 90 to 94%, 4 to 6%, 0.1% to 0.4% and 2 to 4% (wt %), respectively.

13. The pouch-type, capacitor-assisted battery cell of claim 1, wherein:
   the second particulate electrode material of the P-M ones of the P positive electrodes have a thickness opposite sides of the third current collector in a range of 50 μm (+/−5 μm);

the second current collector comprises carbon-coated aluminum foil having a thickness in a range of 12 μm (+/−2 μm);

the second current collector has a width in a range of 13 cm (+/−5%); and the second current collector has a height in a range of 10 cm (+/−5%).

14. The pouch-type, capacitor-assisted battery cell of claim 1, wherein:

the third particulate electrode material of the M ones of the P positive electrodes has a thickness on opposite sides of the third current collector in a range of 100 μm (+/−30 μm);

the third current collector comprises etched aluminum foil having a thickness in a range of 20 μm (+/−2 μm);

the third current collector has a width in a range of 13 cm (+/−5%); and the third current collector has a height in a range of 10 cm (+/−5%).

15. The pouch-type, capacitor-assisted battery cell of claim 1, wherein:

the third particulate electrode material of the M ones of the P positive electrodes have a thickness opposite sides of the third current collector in a range of 100 μm (+/−30 μm); and the third current collector comprises etched aluminum foil having a thickness in a range of 20 μm (+/−2 μm).

16. A pouch-type, capacitor-assisted battery cell, comprising:

N negative electrodes, where N is equal to 28, wherein each of the N negative electrodes comprises a first current collector having a width in a range of 13.2 cm (+/−5%) and a height in a range of 10.3 cm (+/−5%), first particulate electrode material comprising graphite arranged on opposite sides of the first current collector, and a first tab;

P positive electrodes, wherein:

P-M ones of the P positive electrodes comprise a second current collector having a width in a range of 13 cm (+/−5%) and a height in a range of 10 cm (+/−5%), second particulate electrode material comprising lithium iron phosphate (LFP) arranged on opposite sides of the second current collector, and a second tab;

M ones of the P positive electrodes comprise a third current collector having a width in a range of 13 cm (+/−5%) and a height in a range of 10 cm (+/−5%), third particulate electrode material comprising activated carbon (AC) arranged on opposite sides of the third current collector, and a third tab; and P is equal to 27 and M is equal to 2;

separators arranged between the N negative electrodes and the P positive electrodes; and a pouch enclosure surrounding the N negative electrodes, the P positive electrodes and the separators.

17. The pouch-type, capacitor-assisted battery cell of claim 16, wherein the M ones of the P positive electrodes are located at a 3rd and $25^{th}$ location.

18. The pouch-type, capacitor-assisted battery cell of claim 16, wherein:

the first particulate electrode material of the N negative electrodes further comprises conductive carbon, carboxymethyl cellulose (CMC) and styrene butadiene copolymer (SBR), and weight percentages of the graphite, the conductive carbon, the carboxymethyl cellulose (CMC) and the styrene butadiene copolymer (SBR) are 94% to 96%, 1.5% to 2.5%, 1% to 2%, and 1% to 2% (wt %), respectively;

the first particulate electrode material of the N negative electrodes has a thickness on opposite sides of the first current collector in a range of 31 μm (+/−5 μm); and the first current collector comprises copper foil having a thickness in a range of 8 μm (+/−2 μm).

19. The pouch-type, capacitor-assisted battery cell of claim 16, wherein:

the second particulate electrode material of the P-M ones of the P positive electrodes further comprises conductive carbon, carbon nanotubes and polyvinylidene fluoride, weight percentages of the lithium iron phosphate, the conductive carbon, the carbon nanotubes and the polyvinylidene fluoride correspond to 90 to 94%, 4 to 6%, 0.1% to 0.4% and 2 to 4% (wt %), respectively;

the second particulate electrode material of the P-M ones of the P positive electrodes have a thickness opposite sides of the third current collector in a range of 50 μm (+/−5 μm); and the second current collector comprises carbon-coated aluminum foil having a thickness in a range of 12 μm (+/−2 μm).

* * * * *